(No Model.)
F. H. BUCHHEIM.
REGISTER FOR GRAIN OR MANURE DRILLS.
No. 418,307. Patented Dec. 31, 1889.
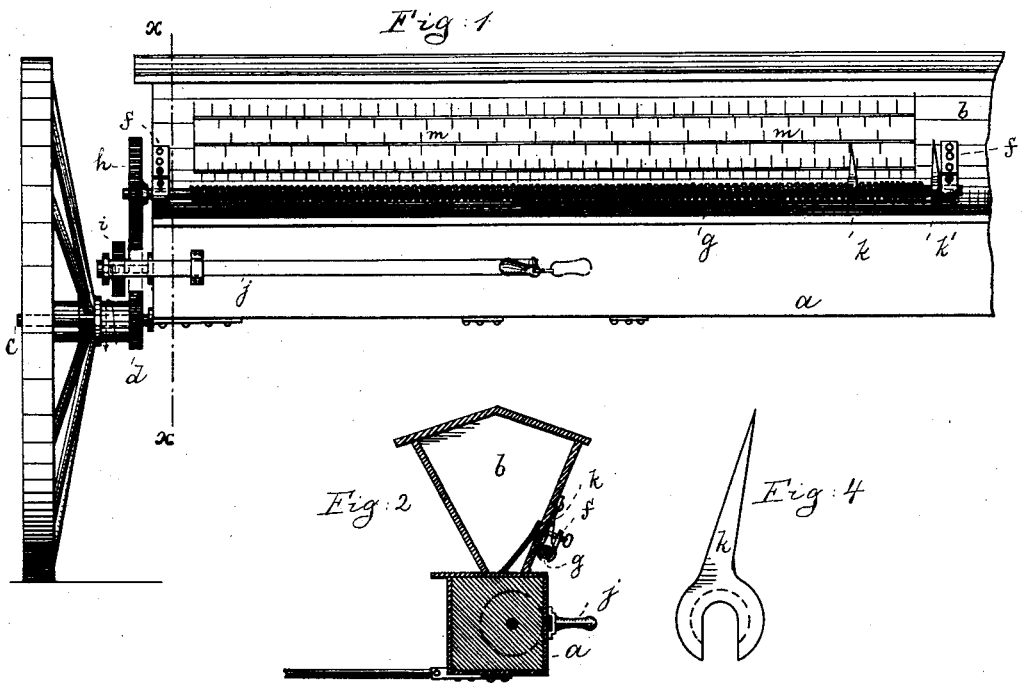
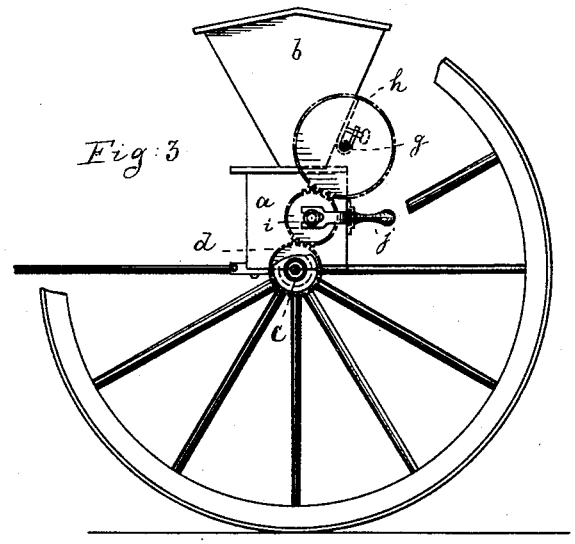
Witnesses:
Wm Wagner
A. Jonghmans
Inventor:
F. H. Buchheim
by his attorneys
Roeder & Briesen

UNITED STATES PATENT OFFICE.

FRIEDRICH HERMANN BUCHHEIM, OF GOLZERN, NEAR GRIMMA, SAXONY, GERMANY.

REGISTER FOR GRAIN OR MANURE DRILLS.

SPECIFICATION forming part of Letters Patent No. 418,307, dated December 31, 1889.

Application filed July 20, 1889. Serial No. 318,122. (No model.)

*To all whom it may concern:*

Be it known that I, FRIEDRICH HERMANN BUCHHEIM, of Golzern, near Grimma, in the Kingdom of Saxony, Germany, have invented an Improved Register for Grain or Manure Drills, of which the following is a specification.

This invention relates to a register for automatically indicating the quantity of seed or fertilizing material deposited by a drill.

In my improved drill an index-finger or pointer upon a screw-shaft is moved along a scale by the motion of the machine to indicate the amount of material discharged.

The invention consists in the various features of improvement, more fully pointed out in the claims.

In the accompanying drawings, Figure 1 is a partial end view of a grain or manure drill provided with my register. Fig. 2 is a section on line $x$ $x$, Fig. 1; Fig. 3, a side view of part of the drill, and Fig. 4 a detail face view of the index-finger.

The letter $a$ represents a grain or manure drill provided with the seed or fertilizer box $b$. Upon axle $c$ of drill $a$ there is mounted the cog-wheel $d$. To the seed-box $b$ there are secured the bearings $f$ of a screw-shaft $g$, upon which is mounted the cog-wheel $h$. This cog-wheel may be intergeared with wheel $d$ by means of the sliding cog-wheel $i$ on lever $j$. The cog-wheel $i$ likewise operates the feeding-cylinder, as usual. When the wheels $d$ $i$ $h$ are intergeared, both the feeding-cylinder and the screw-shaft are made to revolve from wheel $d$; but when the wheel $i$ is thrown out of gear with wheels $h$ $d$ by means of its lever $j$ neither of the wheels $i$ $h$ will revolve. Thus the screw-shaft will turn only when seed or fertilizing material is discharged from the machine. Upon the screw-shaft $g$ there is set a suitable index-finger or pointer $k$, running along scale $m$. This pointer is slotted at its lower end, so as to be readily placed upon and removed from the screw-shaft. The pointer $k$ engages with its lower slotted edge the convolutions of the screw-shaft, so that upon the revolution of the latter the pointer will be moved from one end of the shaft to the other end and along the scale $m$. In this way while the drill is in operation the pointer will indicate upon the scale the amount of seed or fertilizing material deposited. When the pointer has reached the end of the screw-shaft, it is lifted off and placed upon the beginning of the shaft. If desired, a second pointer $k'$ may be employed, which is placed upon the shaft when the first pointer approaches the end of its travel.

What I claim is—

1. The combination of a drill with a revolving screw-shaft, a pointer placed upon and moved by said shaft, and a scale opposite the pointer, substantially as specified.

2. The combination of a drill with a screw-shaft, a sliding cog-wheel $i$, adapted to throw the screw-shaft into and out of gear with the feeding-cylinder and axle $c$, and with a pointer mounted upon and revolved by the screw-shaft, substantially as specified.

3. The combination of a drill with a revolving screw-shaft, a pointer slotted at its lower end for engagement with said screw-shaft and with a scale opposite the pointer, substantially as specified.

In testimony whereof I have signed my name to this specification in the presence of two subscribing witnesses.

FRIEDRICH HERMANN BUCHHEIM.

Witnesses:
MAX MATTHAI,
ERNST VOGEL.